United States Patent [19]
Boucher et al.

[11] 3,943,508
[45] Mar. 9, 1976

[54] ELECTRONIC ROLL COMPENSATION SYSTEM FOR A RADAR ANTENNA

[75] Inventors: Robert J. Boucher, Los Angeles; Robert L. Brackney, Jr., Whittier, both of Calif.

[73] Assignee: Hughes Aircraft Company, Culver City, Calif.

[22] Filed: Mar. 25, 1971

[21] Appl. No.: 128,105

[52] U.S. Cl. ............................. 343/5 R; 343/16 M
[51] Int. Cl.² ....................... G01S 9/02; G01S 9/22
[58] Field of Search ............ 343/5 R, 16 M, 16 LS; 244/3.19

[56] References Cited
UNITED STATES PATENTS

| | | | |
|---|---|---|---|
| 2,961,656 | 11/1960 | Gipe | 343/5 R X |
| 3,008,097 | 11/1961 | Tetenbaum | 343/5 R |
| 3,031,631 | 4/1962 | Moran | 333/1.1 |
| 3,141,635 | 7/1964 | Davis et al. | 244/3.19 X |

FOREIGN PATENTS OR APPLICATIONS

| | | | |
|---|---|---|---|
| 846,026 | 8/1960 | United Kingdom | 343/16 M |
| 1,142,632 | 9/1957 | France | 343/16 LS |

*Primary Examiner*—Malcolm F. Hubler
*Attorney, Agent, or Firm*—Paul H. Ware; W. H. MacAllister

[57] ABSTRACT

A simplified and reliable system for electronically controlling the angular position relative to an antenna axis of the ground areas from which radar signals are received and processed so that air-to-ground range may be measured accurately regardless of the roll angle of the aircraft in which the radar is mounted. In a radar silent lobing system in which lobing is done on reception of the transmitted signals, the roll compensation system provides direct current signals which are proportional to the sine and cosine of one-half the roll angle and which are selectively applied to the pole pairs of the azimuth and elevation poles of the ferrite modulator that is utilized in the lobing system. During range determining operations, first and second pole pairs each of an azimuth and elevation pole, or group of azimuth and elevation poles, are energized or selected during alternate lobing or pulse repetition frequency intervals. The system functions at any roll angle $\alpha$ by positioning the magnetic field of the modulator at $\alpha/2$ degrees so as to shift the components of the modulator input so that the vector sum at the output will be vertical, resulting in a constant output being provided to the radar receiver regardless of the roll angle of the aircraft.

10 Claims, 12 Drawing Figures

| Input | Magnetic Field | Output of Modulator | Output into Rectangular Waveguide | Component Absorbed |
|---|---|---|---|---|
| Azimuth / Elevation | 0° | 331 | | |
| | 22.5° | 333 | 0.707 / 0.707 | 0.707 / 0.707 |
| | 45° | 335 | | |

ELECTRONIC ROLL COMPENSATION SYSTEM FOR A RADAR ANTENNA

BACKGROUND OF THE INVENTION

1 Field of the Invention

This invention relates to roll compensation systems for radar mounted in aircraft and particularly to an electronic roll compensation system for use in a silent lobing type of radar that provides lobing of the received signals.

2. Description of the Prior Art

Conventionally, radar compensation of aircraft angular roll is provided by mechanical stabilizing systems which operate so that the antenna angular roll position relative to the ground does not change with any aircraft roll angle. However, in these stabilized systems, separate gimbal and drive systems are thus required in addition to those needed for scanning. The gimbal and drive systems required for the mechanical antenna stabilization add considerable weight and complexity to the aircraft installation. Although the exact amount of weight increase varies according to the particular equipment, typical increases are on the order of 20 pounds. Another problem is that the additional gimbal required for roll stabilization also increases the size of the overall antenna assembly with the result that within a given installation space, the area of the radiating portion of the antenna and consequently the antenna gain must be reduced. It would be a substantial advance to the art if it were possible to achieve the required antenna stabilization without adding appreciable weight to the equipment and without any substantial reduction of available antenna space and antenna gain.

SUMMARY OF THE INVENTION

Briefly, the roll compensation system in accordance with the invention may be utilized in a radar system that provides beam lobing on reception and in which the received difference signals are applied through a rotatable modulator such as a ferrite modulator and in turn into a coupling circuit. The sum signal is also applied to the coupling circuit and the combined signal, which includes the silent lobing modulation, is then applied to processing circuits. The system of the invention provides accurate and reliable range determination such as required in terrain avoidance or terrain clearance operation for example, by properly controlling the ferrite modulator so as to eliminate the effects of antenna roll. The system functions at any roll angle $\alpha$ by positioning the magnetic field of the modulator at $\alpha/2$ degrees which in turn shifts the components of the modulator input so their vector sum will be in the elevation plane and may be treated as the true elevation signal. The roll angle information may be derived from any suitable angle measuring source and processed in an analog or digital computer to provide voltages proportional to sine $\alpha/2$ and cosine $\alpha/2$. These signals are then amplified to provide sufficient current for energizing the magnetic field of the modulator and are rectified to provide suitable DC voltages. After passing through a switching arrangement operating at the radar pulse repetition frequency, the signals are applied to alternate pairs of elevation and azimuth poles so as to properly rotate the modulator field and to alternately provide a signal above and below the elevation axis. The signals are then applied to separate boxcar detectors during alternate pulse repetition intervals and compared in a suitable difference amplifier. The output of the amplifier is utilized in an upper and lower gating arrangement to indicate the null in the elevation and difference pattern, which null is independent of any angular rotation of the antenna relative to the target area. The null indication is then utilized to provide an accurate range on the antenna boresight.

It is therefore an object of this invention to provide an improved radar system for measuring air-to-ground range.

It is a further object of this invention to provide an electronic roll compensation system for a radar system that does not require additional antenna gimbal structures.

It is another object of this invention to provide an electronic roll compensation system for a radar system having a modulator to provide lobing on reception.

It is another object of this invention to provide an improved terrain avoidance or clearance system operable with a radar signal modulator.

It is still another object of this invention to provide a compensation system for controlling an aircraft angular position relative to the antenna axis so that air-to-target range can be measured accurately in a system that compares the return energy above and below the antenna elevation axis, regardless of the roll angle of the aircraft on which the radar is mounted.

BRIEF DESCRIPTION OF THE DRAWINGS

These and other objects, features and advantages of the invention itself, will become apparent to those skilled in the art in the light of the following detailed description taken in consideration with the accompanying drawings wherein like reference numerals indicate like or corresponding parts throughout the several parts wherein.

DESCRIPTION OF THE PREFERRED EMBODIMENT

Figure 1:
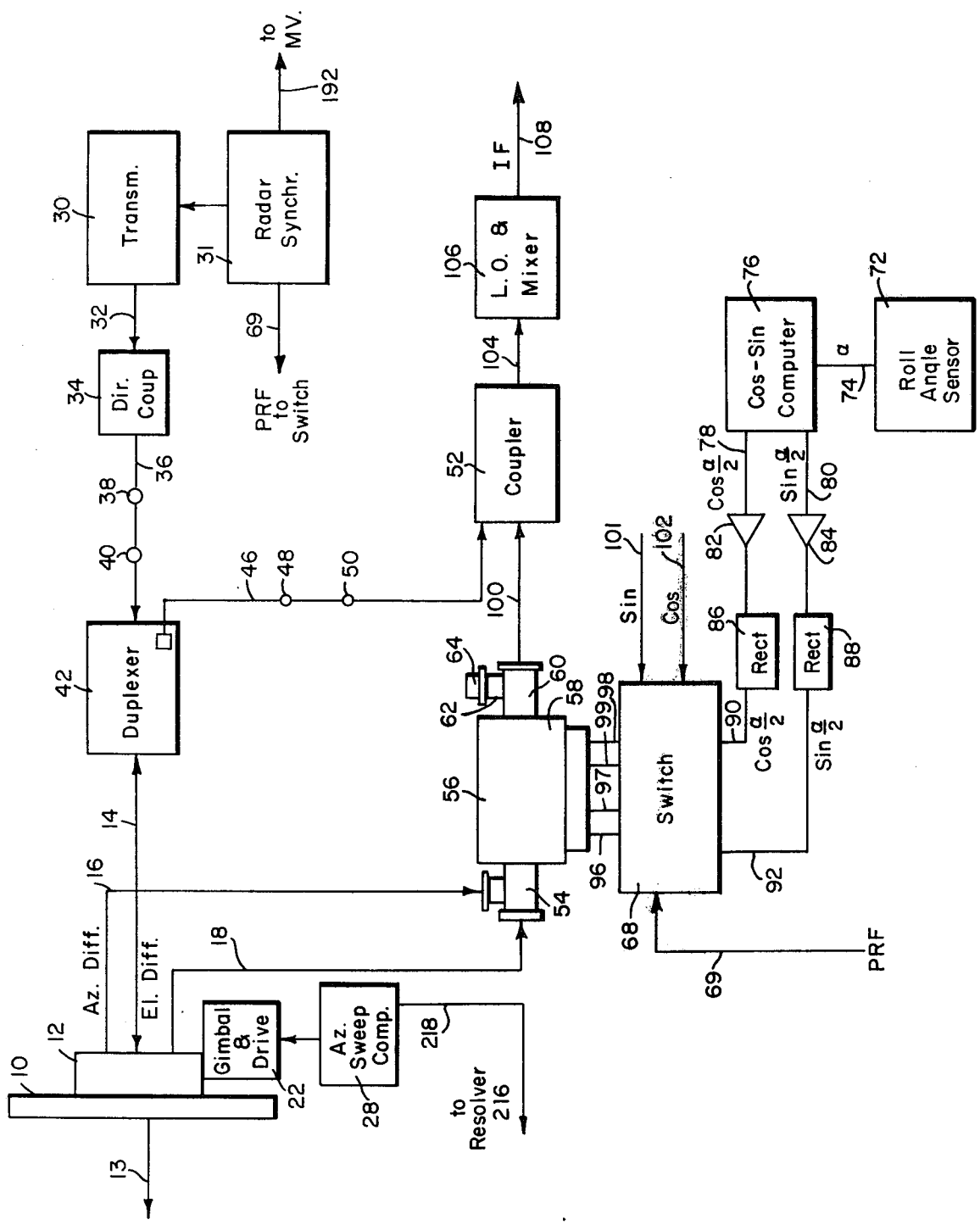
FIG. 1 is a schematic block diagram showing a first portion of the roll compensation system in accordance with the invention.

Referring first to FIG. 1 which shows a roll compensation system in accordance with the principles of the invention, a suitable antenna 10 is provided which may be the planar array antenna illustrated or may be any other suitable antenna arrangement such as a parabolic dish. The antenna 10 may transmit and receive energy along a boresight axis 13 which with electronic scan is in the direction of pointing of the energy pattern. Coupled to the antenna 10 is a sum and difference network 12 which, in response to transmitted energy applied therethrough to the antenna 10 on a suitable lead or waveguide 14, receives reflected energy from the antenna feeds and converts it into an azimuth difference signal on a lead or waveguide 16, an elevation difference signal on a lead or waveguide 18 and a sum signal which is applied to the waveguide 14. The antenna 10 may include a suitable gimbal and drive structure 22 which may provide horizontal and vertical stabilization as is well-known in the art and may respond to an azimuth sweep generator or computer 28 to provide a mechanical and stabilized azimuth sweep of the antenna 10. The stabilization of the antenna scan in azimuth may be performed by conventional arrangements such as shown starting on Page 440 of the book "Airborne Radar" by Povejsil, Raven and Waterman, copyright 1961, Van Nostrand Publisher, reprinted 1965 Boston Technical Publishers, Inc. It is to be noted that the invention is not to be limited to mechanical sweep systems but is equally applicable to systems utilizing electronic scan of either frequency or phase types.

For the transmission of energy into space from the antenna 10, a transmitter 30 as is well-known in the art, may apply energy through a suitable waveguide or conductor 32 to a directional coupler 34 and in turn through a lead or waveguide 36 and rotary joints 38 and 40, when required, to a duplexer 42. The directional coupler 34 is not a necessary part of a system that uses this invention but may be needed for other modes of operation. A radar synchronizer 31 applies pulse repetition frequency (PRF) synchronizing pulses to the transmitter 30. The transmitted energy is then applied through the duplexer 42 to the waveguide 14 for transmission from the apertures of the antenna 10. Upon reception, the sum signal developed by the sum and difference network 12 is applied through the waveguide 14 to the duplexer 42 and in turn through the lead or waveguide 46 and rotary joints 48 and 50 when required, to an orthogonal coupler 52 which in some arrangements may be a variable microwave coupler. The azimuth difference signal and the elevation difference signal on respective leads 16 and 18 are applied to a coupler 54 of a ferrite modulator 56 where the energy is coupled into a rectangular waveguide portion with elevation and the azimuth vectors orthogonally polarized or displaced 90° from each other in space position. The output signal of the rectangular waveguides section is applied through a portion 58 to an orthogonal coupler 60 which accepts only output energy that is in line with its narrow dimension. The energy that is orthogonally polarized is not accepted but is accepted by a second rectangular waveguide portion 62 terminated in a dummy load 64.

For providing the improved operation in accordance with the invention, a switching unit 68 in response to the PRF synchronizing signal on a lead 69 from the radar synchronizer 31 provides switching between pole pairs of the modulator 56, with each pair formed of an elevation and an azimuth pole. A roll angle sensor 72 which may be any suitable angle measuring device such as a navigation platform or navigation gyro arrangement provides a roll angle $\alpha$ signal through a lead 74 to a cosine-sine computer 76 which responds to the roll angle information and may be an analog or digital type computer as is well-known in the art. The roll angle $\alpha$ is an angular component of roll around the aircraft axis or boresight axis 13. The antenna scan computer 28 controls the antenna scan in space coordinates so that the angle $\alpha$ measured in the aircraft navigation platform is the correct roll angle of the antenna around the boresight axis through all azimuth scan angles. The scan command is derived from a combination of azimuth and elevation components so that the space scan is in azimuth only. Controls of this type are well-known in the art and may be the type explained in the above referenced book. Voltages proportional to sine $\alpha/2$ and cosine $\alpha/2$ are then applied through respective leads 78 and 80 to respective amplifiers 82 and 84 to increase the current amplitude of the signal. After amplification, the cosine and sine signals are respectively rectified in rectifiers 86 and 88 to provide DC voltages cos $\alpha/2$ and sin $\alpha/2$ on respective leads 90 and 92, which signals are then applied to the switch unit 68. The current signals are applied from the switch unit 68 through leads 96 through 99 into corresponding poles of the ferrite modulator 56 with the cos signal controlling the elevation poles and the sin signal controlling the azimuth poles. The energy applied through the coupler 60 alternately from above and below the elevation plane is applied through a suitable lead or waveguide 100 to the coupler 52 to be combined with a suitable portion of the sum energy received on the waveguide 46 from the duplexer 42. The combined signal is then applied from the coupler 52 through a suitable lead or waveguide 104 to a local oscillator and mixer unit 106 as is well-known in the art, which applies an IF signal to a lead 108.

Figure 2:
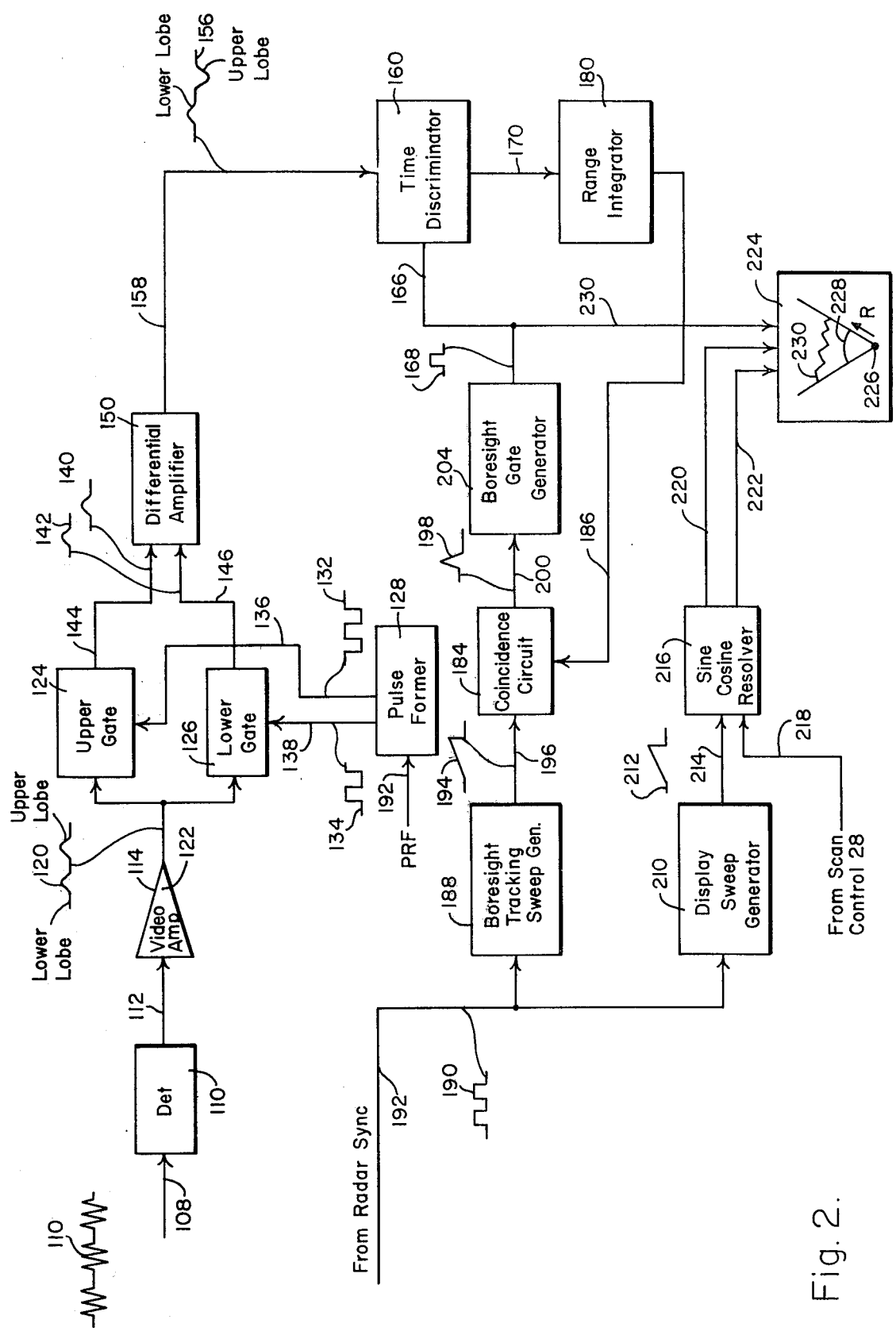
FIG. 2 is a schematic block diagram showing a second portion of the electronic roll compensation system in accordance with the invention.

Referring now principally to FIG. 2, which is a processor system for terrain avoidance with the boresight range determination in accordance with the invention, the IF signal on the lead 108 as indicated by waveform 110 is applied to an envelope detector 110 which may be of a conventional type, and in turn applied through a lead 112 to a video amplifier 114. The video envelope of a waveform 120 having a lower lobe portion resulting from the ferrite modulator being switched during a first PRF interval and an upper lobe portion resulting from second or alternate PRF intervals is applied from the video amplifier 114 through a lead 122 and through an upper gate 124 and a lower gate 126. During each radar sweep time period, either an upper lobe or a lower lobe signal of the waveform 120 is applied to the two gates 124 and 126. A pulse former 128 responding to the pulse repetition frequency signal on a lead 192 from the radar synchronizer 31 (FIG. 1) applies alternate pulses of waveforms 132 and 134 through respective leads 136 and 138 to respective gates 124 and 126. During the positive portions of the signals of the waveforms 132 and 134 the respective gates sequentially pass an upper lobe signal and lower lobe signal of the waveforms 140 and 142 on respective leads 144 and 146 to a differential amplifier 150. The upper lobe signal is inverted in the differential amplifier 150 to apply an amplified signal of a waveform 156 through a lead 158 to a time discriminator 160.

The time discriminator 160 responds to the signal of the waveform 156 and the pulse of a waveform 168 applied through a lead 166, to periodically pass energy from the lead 158 into a storage capacitor (not shown). The time discriminator 160 may for example include a series path of a resistor the anode to cathode of a first diode, a resistor, the anode to cathode of a second diode and another resistor coupled between suitable potential sources. The cathode of the first diode and the anode of the second diode may be respectively coupled through the cathode to anode path of a third diode and to the anode to cathode path of a fourth diode to a storage capacitor which may be in turn coupled to an output lead 170. The pulse of the waveform 168 may be applied through an inverting arrangement so as to apply a negative pulse to the anode of the first diode and a positive pulse to the cathode of the second diode. The lead 158 may be coupled to the resistor between the cathode of the first diode and the anode of the second diode so as to pass or receive energy from the storage capacitor during the period of the pulse of the waveform 168. The current passing through the capacitor or the current discharging from the capacitor is determined by the amplified either positive or negative portion of the lower lobe or the upper lobe signal of the waveform 156. The stored signal in the time discriminator 160 is then applied through the lead 170 to a range integrator 180, which as is well-known in the art, forms a DC signal representative of the stored energy in the time discriminator 160, which signal is in turn applied to a coincidence circuit 184 through a lead 186. A boresight tracking sweep generator 188 is provided for responding to synchronizing pulses of a waveform 190 applied from the radar synchronizers 31 of FIG. 1 on a lead 192. The sweep generator 188 applies a linear sweep voltage of a waveform 194 through a lead 196 to a coincidence circuit 184. In response to a voltage coincidence of the sweep of the waveform 194 and the DC level of the signal on the lead 186, representing the stored range in the range integrator 180, the pulse of a waveform 198 is applied through a lead 200 to a boresight gate generator 204 which forms the pulse of the waveform 168.

A display sweep generator 210 is provided to respond to the radar synchronizing pulses of the waveform 190 to periodically develop a display sweep of a waveform 212 on a lead 214. A sine-cosine resolver 216 is provided to respond to the sweep signal of the waveform 212 and a scan reference signal (not shown) applied from the scan control circuit 28 through a lead 218 to provide azimuth sweep reference. The sine-cosine resolver 216 may be a conventional sine-cosine potentiometer arrangement in which the sweep signal and an inverted form thereof are applied to opposite corners of a bridge circuit and rotating taps positioned 90° relative to each other rotate in an arc to contact the bridge resistors at the rate and coincidence with the azimuth sweep of the beam of the antenna 10. As a result, suitable sine $\theta$ and cosine $\theta$ signals are applied through leads 220 and 222 to a display system 224, which for example may be a conventional cathode ray tube display. The sine and cosine signals on the leads 220 and 222 may control horizontal and vertical deflection plates so that the electron beam signals from an apex point 226 periodically moves radially representative of range at a continually increasing angle representing the angular azimuth position of the antenna axis. The pulse of the waveform 168 indicative of the range of the antenna boresight axis is applied through a lead 230 to the intensity modulating element of the cathode ray tube of the display system 224 which may be the grid for example. It is to be noted that a line 230 may represent the terrain profile as a function of azimuth position and range in response to the electron beam and a line 228 which may be etched on the surface may be a calculated range at a selected distance below the craft. It is to be also noted that the system in accordance with the invention is not limited to any particular type of display and may operate with terrain avoidance, terrain clearance, contour mapping or any suitable type of display. Also the principles of the invention are not limited to utilization in a display but the accurate boresight axis data may be utilized in computations such as in a computer system.

Figures 3, 5:
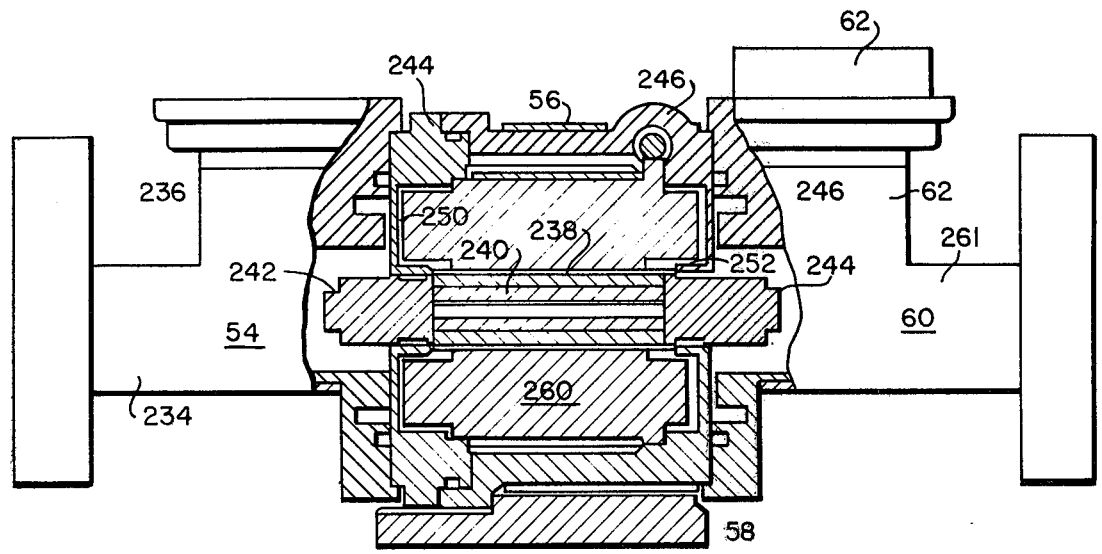
FIG. 3 is a partially schematic cross-sectional drawing of the ferrite modulator utilized in the system of FIG. 1.
FIG. 5 is a table for explaining the azimuth and elevation inputs and the outputs from the modulator of FIG. 1.

Referring now to FIG. 3, a partially broken plan view of the ferrite modulator 56 is shown for explaining the operation thereof. The coupler 54 which is an orthogonal mode transducer couples the unmodulated elevation and azimuth difference or error signals into a common waveguide signal which is then passed into the rectangular portion 58. Because the narrow dimensions of the waveguide section 234 and the wide portion of the waveguide section 236 are horizontal, the polarity of the respective elevation and azimuth electrical vectors are combined in rotational space quadrature. The combined error signal is then applied to a ferrite cylinder 238 having a suitable internal supporting cylinder 240 which may be formed of a dielectric plastic material. A pair of impedance matching dielectric plugs 242 and 244 are abutted against opposite ends of the ferrite cylinder 238 within suitable cylindrical supporting structures 244 and 246. A pair of cylindrical flange shaped supporting structures 250 and 252 are provided. The cylinder 240 may develop sufficient dielectric loading so that the ferrite cylinder 238 may operate at the desired frequency such as X-band frequency, for example.

Surrounding the ferrite cylinder 240 is a cylindrical two-phase winding array 260 wound in a conventional polyphase fashion to have four magnetic poles, for example. The polyphase winding array 260 which is similar to the stator of a conventional motor is supported by the structures 244, 246, 250 and 252 and has four leads plus a reference or ground lead connected to a suitable external terminal (not shown). It is to be noted that although the concepts of the invention are explained relative to a four-pole ferrite modulator, it is not to be limited to four poles but any desired number such as eight magnetic poles may be utilized within the principles of the invention, by controlling two groups of poles instead of two pole pairs.

During normal lobing operation, the angularly rotated error signals are applied from the ferrite modulating section 58 to the orthogonal mode transducer or coupler 60. A waveguide section 261 has a narrow dimension in the horizontal position so that only the components of the error signal in the horizontal or right-left plane are accepted thereby. The waveguide section 62 accept error signal components in the updown plane in the view of FIG. 3 which are absorbed by the dissipating load 62. The couplers 54 and 60 are attached to the modulating section 241 by welding or with flanges for example. The invention is applicable to any suitable type of rotating modulator.

Figure 4:
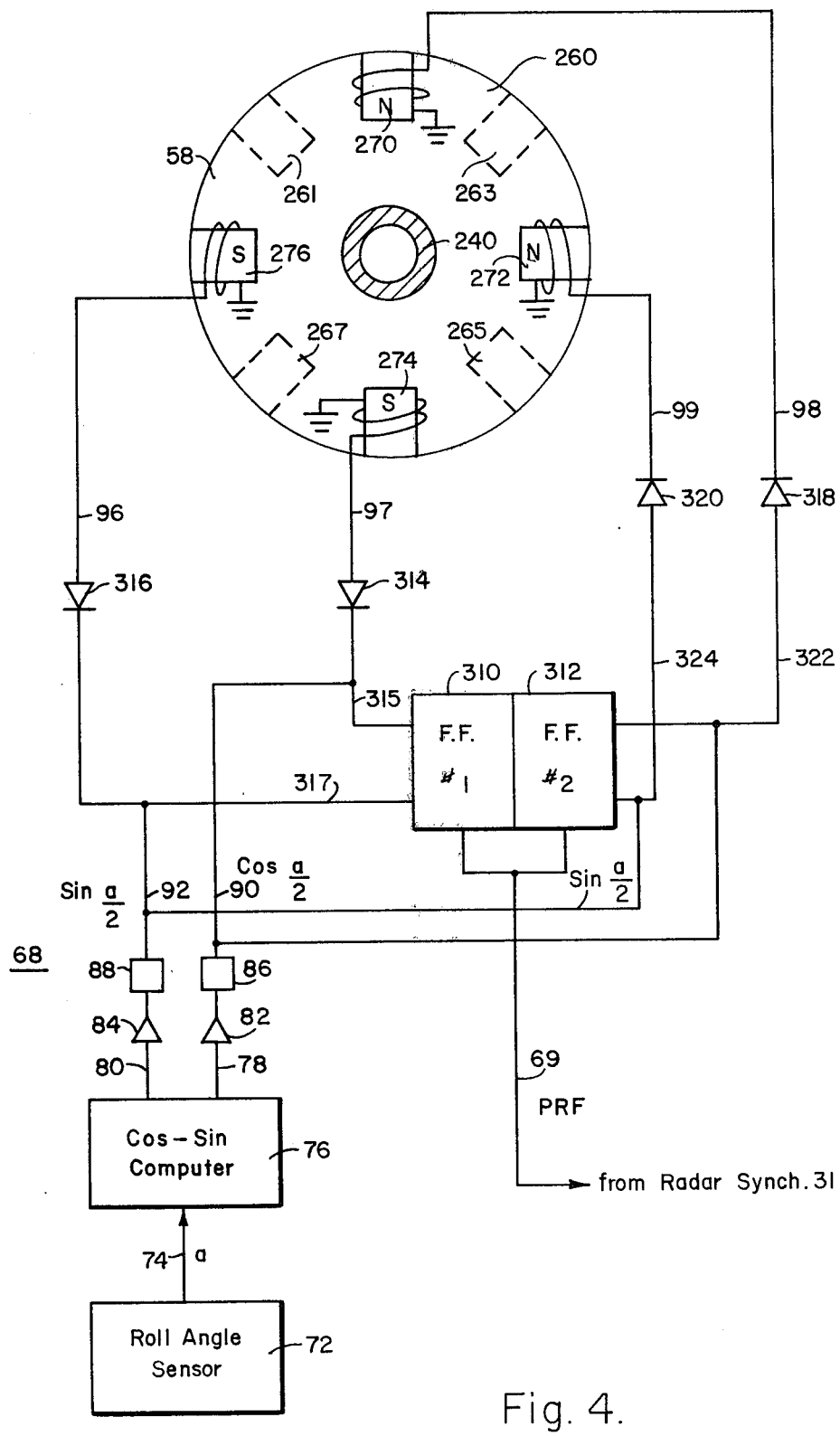
FIG. 4 is a partially schematic cross-sectional drawing and block diagram of the ferrite modulator and the field control system of FIG. 1.

Referring now also to FIG. 4 which is a partially schematic cross-sectional drawing of the modulating section 58, the arrangement of the polyphase rotating or switching field will be further explained. This field winding 260 includes a plurality of poles such as 270, 272, 274 and 276 shown for illustrative purposes. It is to be understood that the poles may be formed by any suitable arrangement of wire coils as is well-known in the motor field art. For silent lobe operation, the ferrite modulator magnetic field is continually rotating by properly phased current signals applied to the leads 96 through 99 through leads 101 and 102 (FIG. 1) from a source (not shown). Any energy that is in line with this field will be rotated 180° at the output of the device while components at an angle of 90° relative to the field are not affected. The RF field is rotated at a frequency that is twice that of the magnetic field. When the four poles are utilized and pole pairs with two frequencies 90° out-of-phase are excited, magnetic field within the modulator will rotate at half the lobing frequency and the error signal output will be rotated at the lobing frequency. Because the circular waveguide at the output accepts only output energy that is in line with its narrow dimension the energy that now appears at the output of the modulator is of the form $e_o = N \sin \omega_{nt} \sin \omega_{xt}$ where N equals the initial error signal, $\omega_n$ equals the modulation component and $\omega_x$ equals X-band or other radar frequency.

For the boresight determination in accordance with the invention the switching unit 68 operates to alternately switch current to an elevation and azimuth pole pair during each pulse repetition frequency interval (each pole pair includes one elevation pole or winding and one azimuth pole or winding). The roll angle sensor 72 which may be a gyro on a navigation platform stabilized in three axes, is utilized to provide the angle $\alpha$ representative of the craft's roll angle and of the roll angle of the stabilized antenna around the boresight axis 13 (FIG. 1). The cosine-sine computer 76 receives the $\alpha$ signal on the lead 74 and develops a sine $\alpha/2$ signal and a cosine $\alpha/2$ signal on respective leads 80 and 78, and after passing through the amplifiers 82 and 84 and the rectifiers 86 and 88, the cos $\alpha/2$ and sin $\alpha/2$ signals are applied to the respective leads 90 and 92. The signal on the lead 74 may be a voltage or a shaft position from a synchro resolver and the cosine-sine computer 76 may be a conventional pair of resolvers including a 2 to 1 gear or voltage reduction as is well-known in the art. Bistable elements or flip-flops 310 and 312 respond to the pulse repetition frequency signal on the lead 69 from the radar synchronizer 31 to both remain in the same state but alternating to opposite flip-flop states in response to each PRF pulse. Leads 97 and 96 are respectively coupled to the true and false terminals 315 and 317 of the flip-flop 310 through the anode to cathode paths of diode 314 and 316. The lead 92 is coupled to the lead 317 and the lead 90 is coupled to the lead 315 for respectively applying DC signals sin $\alpha/2$ and cos $\alpha/2$ through alternately forward-biased diodes 316 and 314 to the respective azimuth and elevation pole pairs 276 and 274. The leads 98 and 99 are coupled through the respective cathode to anode paths of diodes 318 and 322 to respective leads 322 and 324 in turn connected to the true and false terminals of the flip-flop 312. The lead 324 is coupled to the lead 92 and the lead 322 is coupled to the lead 90 to receive the signals from the cosine-sine computer 76. In each state of the flip-flop 312 either the diode 318 or the diode 320 is forward-biased to apply the respective DC signals cos $\alpha/2$ and sin $\alpha/2$ to the respective elevation or azimuth poles. Thus, during each PRF interval, alternate pole pairs are selected to reverse the magnetic field in the modulator.

Referring now to FIG. 5 as well as to FIGS. 3 and 4, the operation of the ferrite modulator 56 will be further explained considering the azimuth vectors shown as solid lines. The input to the modulator is shown as azimuth vectors 319, 321 and 323 respectively applied to magnetic fields 325, 327 and 329 rotated at angles 0°, 22.5° and 45°. The output of the modulator section 58 is shown by azimuth vectors 331, 333 and 335. The last two columns of FIG. 5 show the azimuth vectors respectively passed through the waveguide sections 261 and 62. The dotted lines in FIG. 5 illustrate the corresponding elevation vectors applied to the modulator.

Figure 6:
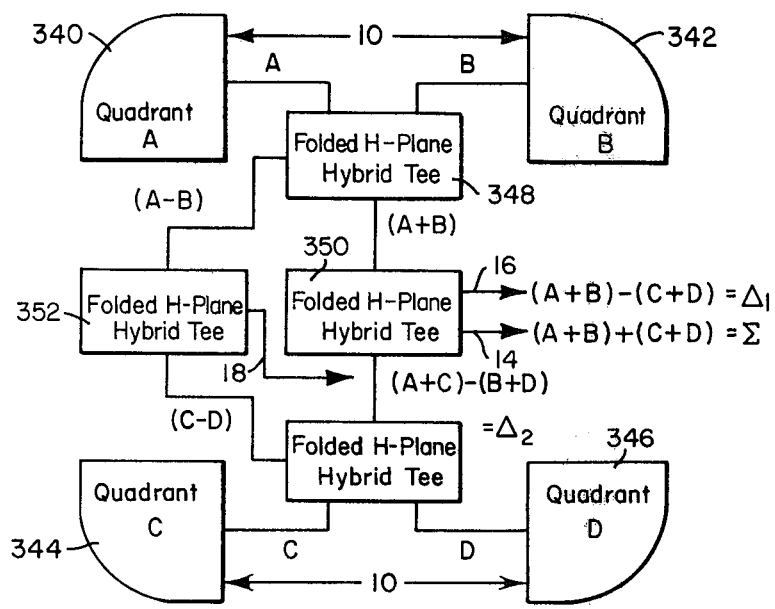
FIG. 6 is a schematic diagram showing a typical sum and difference network that may be utilized in the system of FIG. 1.

Referring now to FIG. 6 the sum and difference network 12 is shown for further explaining the operation thereof. The antenna 10 includes quadrants 340, 342, 344 and 346 respectively indicated as quadrants A, B, C and D. A folded H-plane hybrid Tee 348 responds to A and B signals to apply a signal A+B to a folded H-plane hybrid Tee 350. A folded H-plane hybrid Tee 352 receives the (A-B) signal from the hybrid 348 and a (C-D) signal from a folded H-plane hybrid Tee 354 to apply a $\Delta_1$ difference signal to the waveguide 18. The hybrid 354 receives the C and D signals from their respective quadrant 344 and 346 and applies a (C+D) signal to the hydrid 350 which in turn applies a first difference signal $\Delta_1$ to the waveguide 16 and a sum signal $\Sigma$ to the waveguide 14. The three signals generated may be expressed as $\Delta_1 = (A+B)-(C+D)$; $\Sigma = (A+B)+(C+D)$ and $\Delta_2 = (A+C)-(B+D)$. The signals A, B, C and D are derived from the single input output ports of the antenna quadrant corporate feed structures as are well-known in the art. Because the antenna is a planar array the resulting monopulse operation is predominantly phase sensing in both planes because the four quadrants are essentially identical. The processing of the quadrants signals in the sum and difference network is thus only a function of the relative phases.

Figure 7:
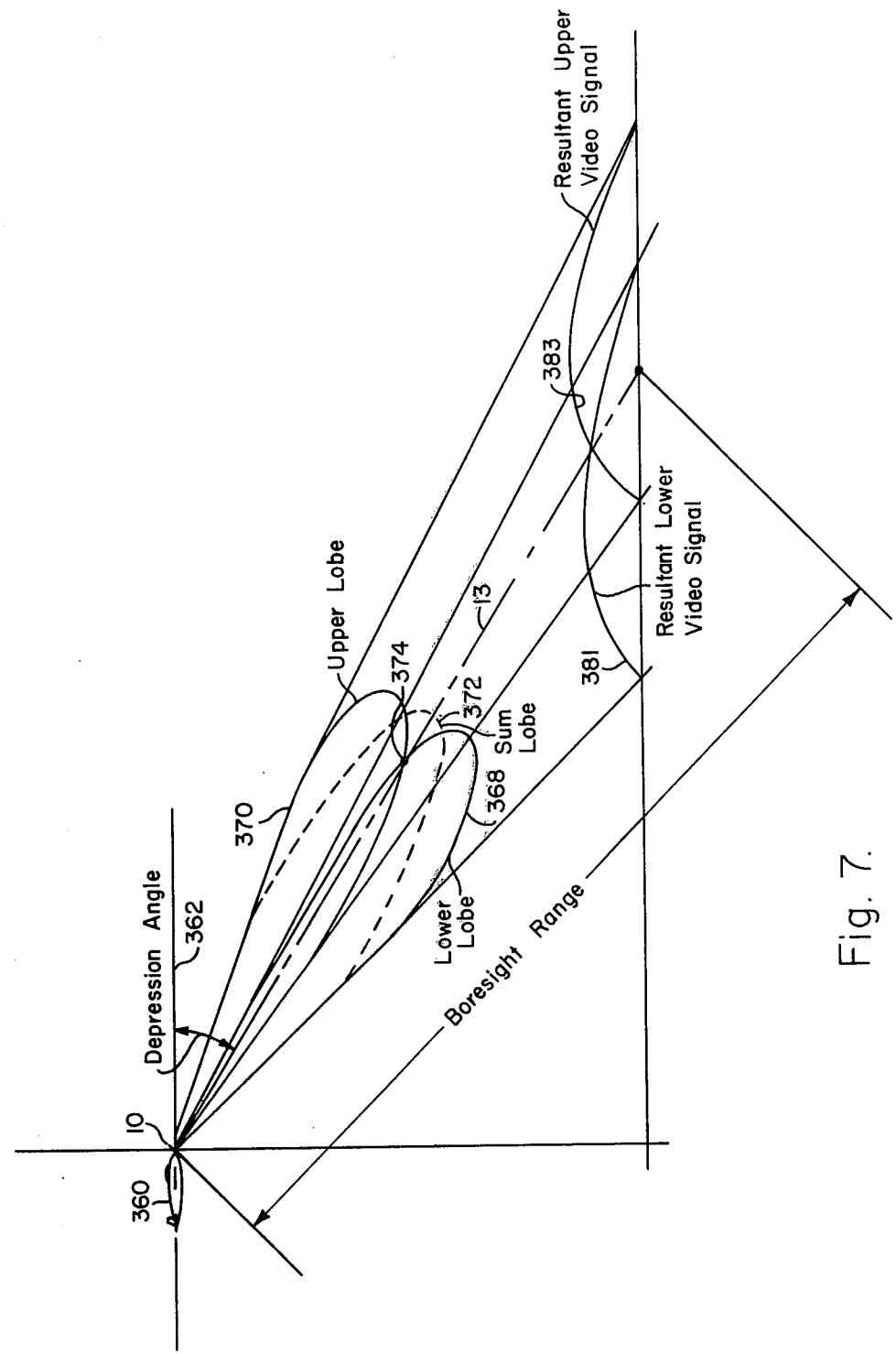
FIG. 7 is a schematic drawing illustrating the craft during terrain avoidance operation for explaining the roll compensation during lobing in accordance with the invention.
Figure 8:
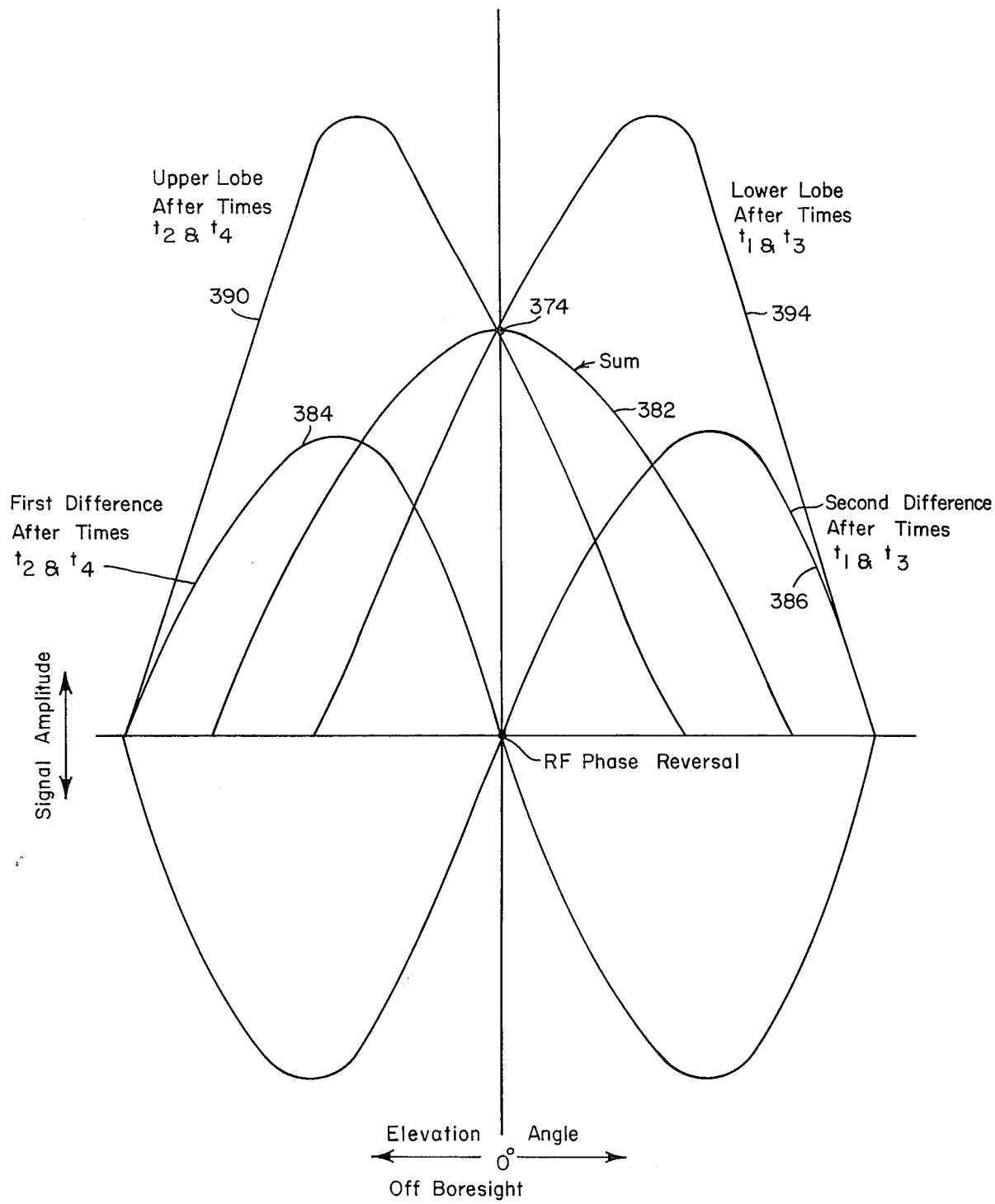
FIG. 8 is a graph of signal amplitude versus elevation angle off boresight for explaining the development of the antenna lobes by the operation of the modulator of FIG. 1 during terrain avoidance operation.

Referring now to FIGS. 7 and 8 the range processing operation will be explained in further detail. A craft 360 may fly horizontally with its azimuth stabilized antenna 10 positioned at a fixed or variable depression angle below a flight path 362 of the craft. It is to be noted that the antenna 10 may be in the radome of the plane 360 but is shown externally for illustrative purposes. In response to the gimbal and drive 22, the antenna 10 continually scans an azimuth through a selected angle. The energy return from terrain for example is in the form of a lower lobe 368 and an upper lobe 370 which are the effective lobes after summing in the system of FIG. 1. A sum lobe 372 is the transmitted energy lobe and also represents the energy of the sum lobe upon return. The boresight axis of the antenna system is at the cross-over point 374 of the lobes 368 and 370 and the center of the sum lobe 372 is shown by a line which is coincident with the boresight axis 13 of FIG. 1. To determine a terrain profile for example, the system in accordance with the invention determines elevation boresight range to terrain or other objects on the boresight axis 13. Indications 381 and 383 which respectively represent the lower and upper video signals after processing, are shown to illustrate that the cross-over point of two video signals at two adjacent time intervals is on the boresight axis 13.

Referring now principally to FIG. 8, the general operation of the modulator 56 to invert the error signal during alternate time periods so as to provide an upper and a lower lobe having characteristics indicative of the boresight axis will be generally explained. Sum energy 382 is returned at RF (radio frequency) in response to each transmitted pulse with a constant reference phase. The difference energy is returned with an RF phase reversal at the boresight axis for energy reflected from objects above and below the boresight axis as shown by first difference signal 384. When the RF energy return is inverted in the modulator 56, polarity of the difference energy in the upper lobe and in the lower lobe are both inverted to form a second difference energy signal 386. The first difference signal 384 when summed with the sum energy signal 382 at the coupler 52 forms an upper lobe 390 crossing over through the boresight axis cross-over point 374. During the next PRF time period when the field of the modulator 56 inverts the electrical vectors, the second difference energy 386 is summed with the sum energy 382 to form a lower lobe 394 also passing through the cross-over point 374. The lobes 390 and 394 are respectively the lobes 370 and 368 of FIG. 7. Thus it can be seen that the cross-over point 374 may be utilized to determine the boresight axis of the antenna 10 and accordingly accurate range on that boresight axis. By combining the sum and difference energy in this manner, the combined signals at the cross-over point have a positive value to allow simplified processing.

Figure 10:
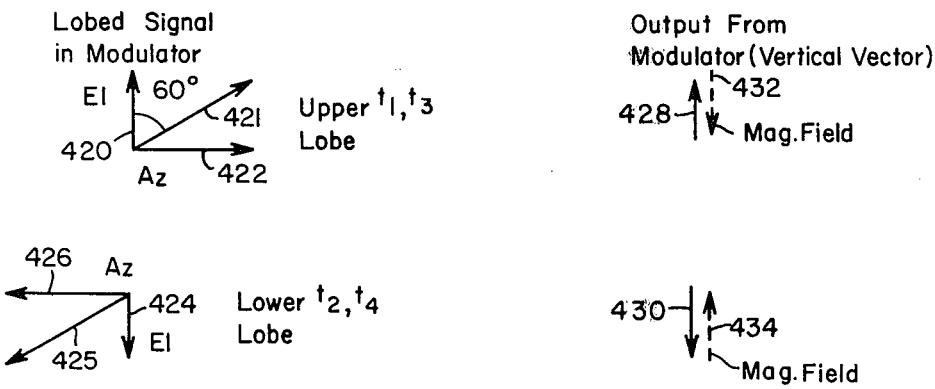
FIG. 10 is a schematic diagram of electrical and magnetic vectors as a function of craft's position for explaining the electronic roll compensation in accor
Figure 10:
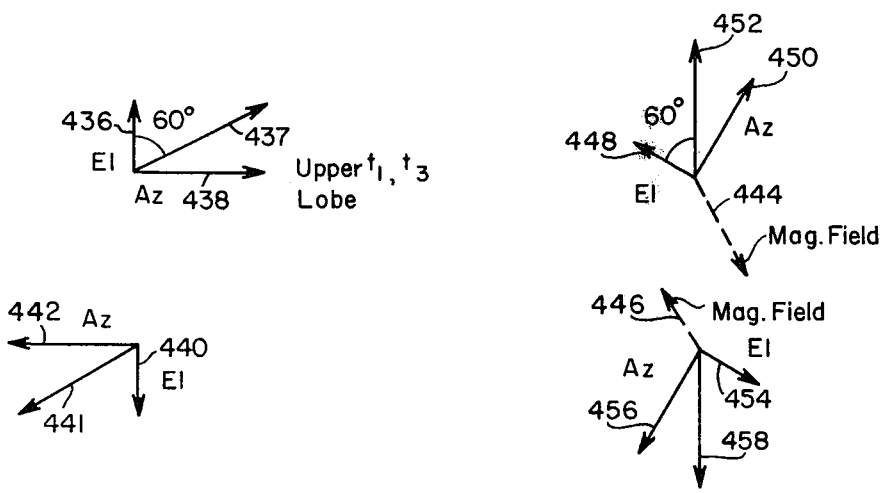
Figure 9:
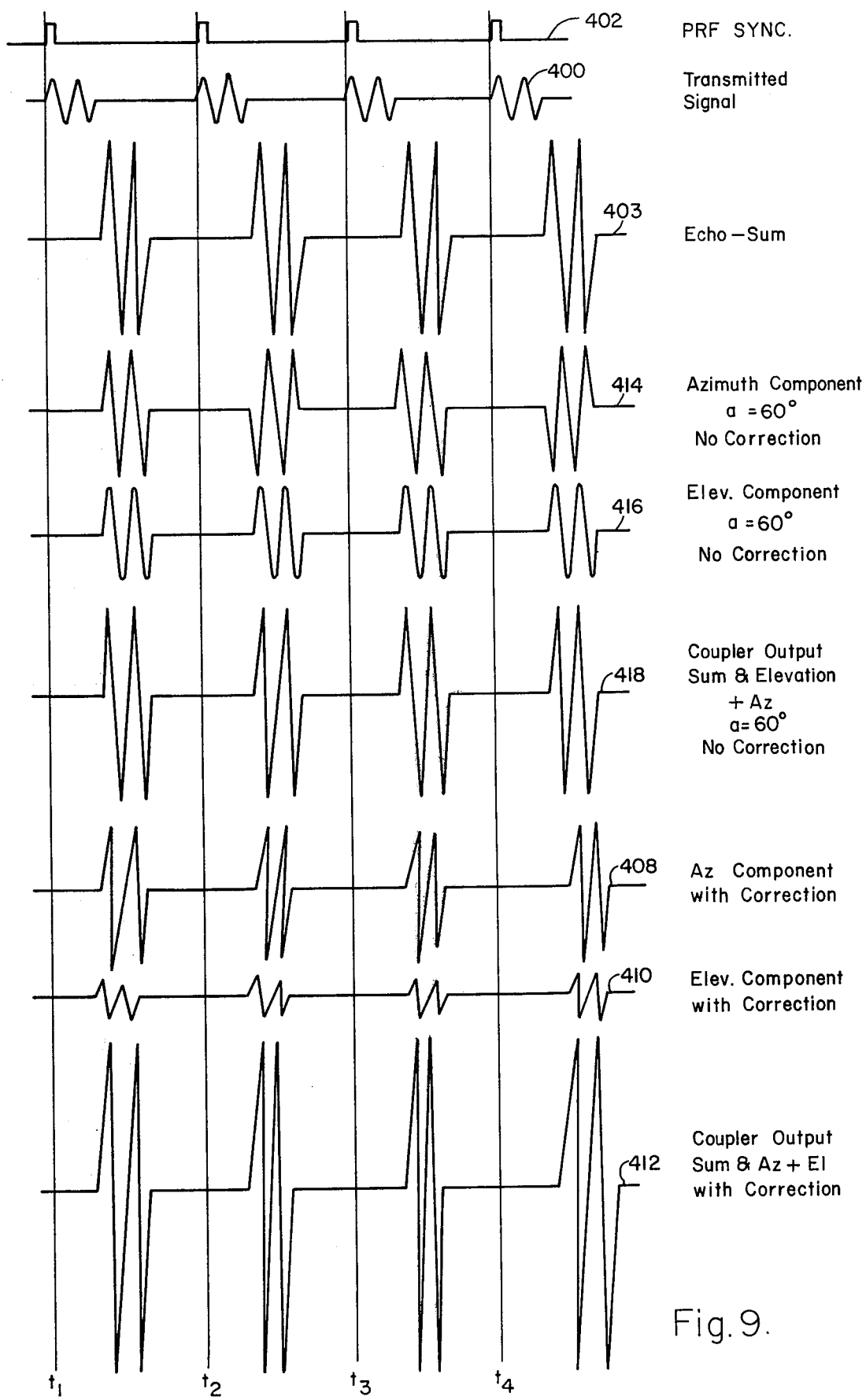
FIG. 9 is a schematic diagram of voltage versus time waveforms for further explaining the range measuring system of FIGS. 1 and 2.

Referring now to FIGS. 9 and 10 as well as to FIG. 1, the operation of the range determining system in accordance with the invention will be explained in further detail. A waveform 400 shows the transmitted signal transmitted into space in response to PRF timing signal of a waveform 402. A waveform 403 indicates the echo sum signal received by the antenna 10 and applied through the sum and difference network 12 to the waveguide 14. It is to be noted that the transmitted signal of the waveform 400 which would be of a relatively large amplitude compared to the waveform 403, is drawn out of scale for convenience of illustration. For a required roll angle $\alpha$ correction of 60°, the signal of a waveform 408 represents the azimuth difference signal in the waveguide 16 and the signal of the waveform 410 represents the elevation signal in the waveguide 18. These signals of the waveforms 408 and 410 are applied to the coupler 60 with the fields being reversed at $t_1$, $t_2$, $t_3$, and $t_4$ times in response to the PRF pulse to the waveform 402. the signals of the waveforms 408 and 410 include the correction applied by the cosine-sine computer 76 in accordance with this invention. At the output of the coupler 52, the combined signal of the sum plus azimuth plus elevation signals in the waveguide 104 is shown by a waveform 412, the phases being maintained constant in the system of the invention. The azimuth component for roll angle of 60° without the correction of the invention is shown by a waveform 414 and the elevation component is shown by a waveform 416. Without the correction of the invention, the coupled output of the sum plus elevation plus azimuth signals in the waveguide 104 is shown by a waveform 418 with substantially less amplitude than the signal of the waveform 412 as provided by the system of the invention.

The vectors in FIG. 10 for the uncorrected condition without the operation of the system of the invention, shows elevation and azimuth vectors 420 and 422 in the ferrite modulator section 58 for the upper lobe energy received at the times $t_1$ and $t_3$ as shown by the vector 421, and the elevation and azimuth vectors 424 and 426 in the modulator section 58 for the lower lobe energy received at times $t_2$ and $t_4$ as the resultant vector 425. The upper and lower lobe outputs without correction from the ferrite modulator as applied to the waveguide 100, is shown as the vectors 428 and 430 in response to respective magnetic fields 432 and 434 being generated in the modulator. With the roll angle correction system in accordance with the invention, a vector 437 is represented by elevation and azimuth vectors 436 and 438 for the upper lobe and a vector 441 is represented by the elevation and azimuth vectors 440 and 442, for the lower lobe, all with a roll angle $\alpha$ of 60°. In response to the operation of the elevation and azimuth pole pairs in which $\sin \alpha/2$ is applied to elevation poles and $\cos \alpha/2$ is applied to the azimuth poles, vectors 444 and 446 represent the rotated magnetic fields of the respective upper lobe and the lower lobes. The El and Az corrected vectors 448 and 450 have been rotated 60° so the resultant output from the ferrite modulator shown by a vector 452 has the same amplitude as if the antenna or aircraft rotation had not been present. For the lower lobe the El and Az vectors 454 and 456 provide a resultant output 458 having the magnitude as if antenna rotation had not been present. Thus, the system of the invention corrects for rotation and treats the resultant as if it were the elevation component, with the result that the signals used for range or other types of processing have relatively large amplitudes and constant amplitudes.

Figure 11:
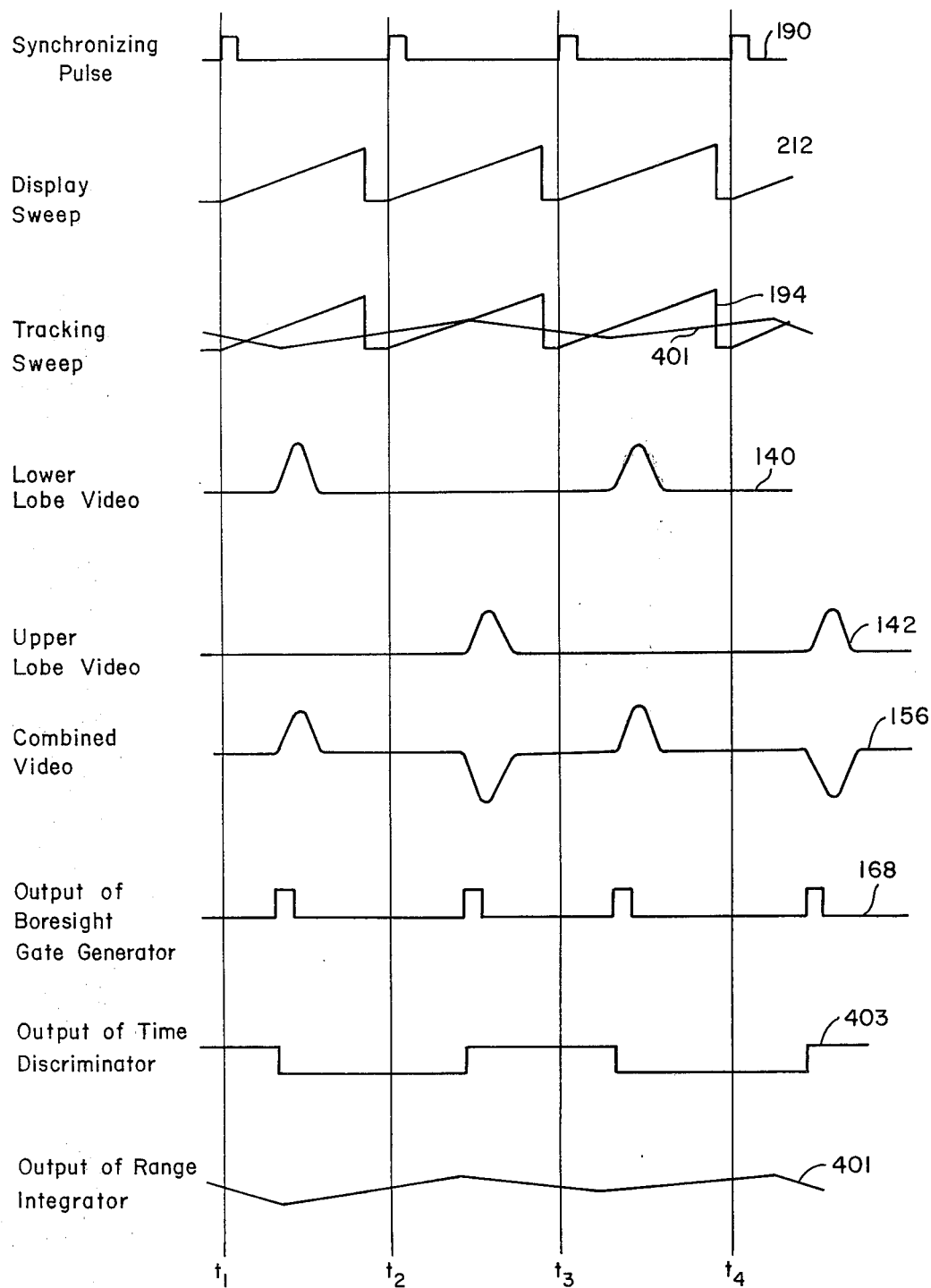
- FIG. 11 is a schematic diagram of voltage waveforms as a function of time for further explaining the operation of the system of FIG. 2.

Referring now to FIG. 11 as well as to FIG. 2 the range determining processing will be explained in further detail. An IF signal of the waveform 110 similar to the waveform 412 of FIG. 9 except heterodyned into IF frequency, resulting from energy return at all angles relative to the boresight axis, is applied from the lead 108 to the envelope detector 110 and in turn to the lead 122 after passing through the video amplifier 114. The video envelope of the waveform 120 having a lower lobe portion resulting from the RF signal after times $t_1$ and $t_3$ and an upper lobe portion resulting from the RF signal after times $t_2$ and $t_4$ in an upper lobe portion is applied on the lead 122 to the gates 124 and 126. It is to be noted that during each time period, either an upper lobe or a lower lobe signal is applied to the waveform 120. The square wave pulse of waveforms 132 and 134 are applied through the leads 136 and 138 to the respective gates 124 and 126. During the positive portions of the signals of the waveforms 132 and 134 the gates 124 and 126 respectively pass a lower lobe signal of a waveform 140 and an upper lobe signal of a waveform 142 through respective leads 144 and 146 to the differential amplifier 150. The differential amplifier 150 inverts the upper lobe signal of the waveform 142 and to apply amplified signals of a waveform 156 to the lead 158. The time discriminator 160 responds to the signal of the waveform 156 the pulse of the waveform 168 to periodically pass energy from the lead 158 into a storage capacitor (not shown).

The linear sweep voltage of the waveform 194 applied to the coincidence circuit 184 develops the pulse 198 in response to a coincident of the sweep voltage of the waveform 194 and the output of the range integrator 180 indicated by a waveform 401. The boresight gate generator 204 thus develops the output pulses of the waveform 168 which are applied to the display tube 224. The time discriminator 160 responds to the boresight pulses of the waveform 168 to develop the time discriminator pulses of the waveform 403 which in turn controls the operation of the range integrator 180. Relative to the signal of the waveform 403 a movement downward in voltage represents a closing range and a movement upwards of the waveform may represent an increasing range. For example, when the waveform 403 moves downward, the lower lobe signal of the waveform 156 may be temporarily passing more energy into the time discriminator 160 than is removed at the time of the upper lobe video signal.

Figure 12:
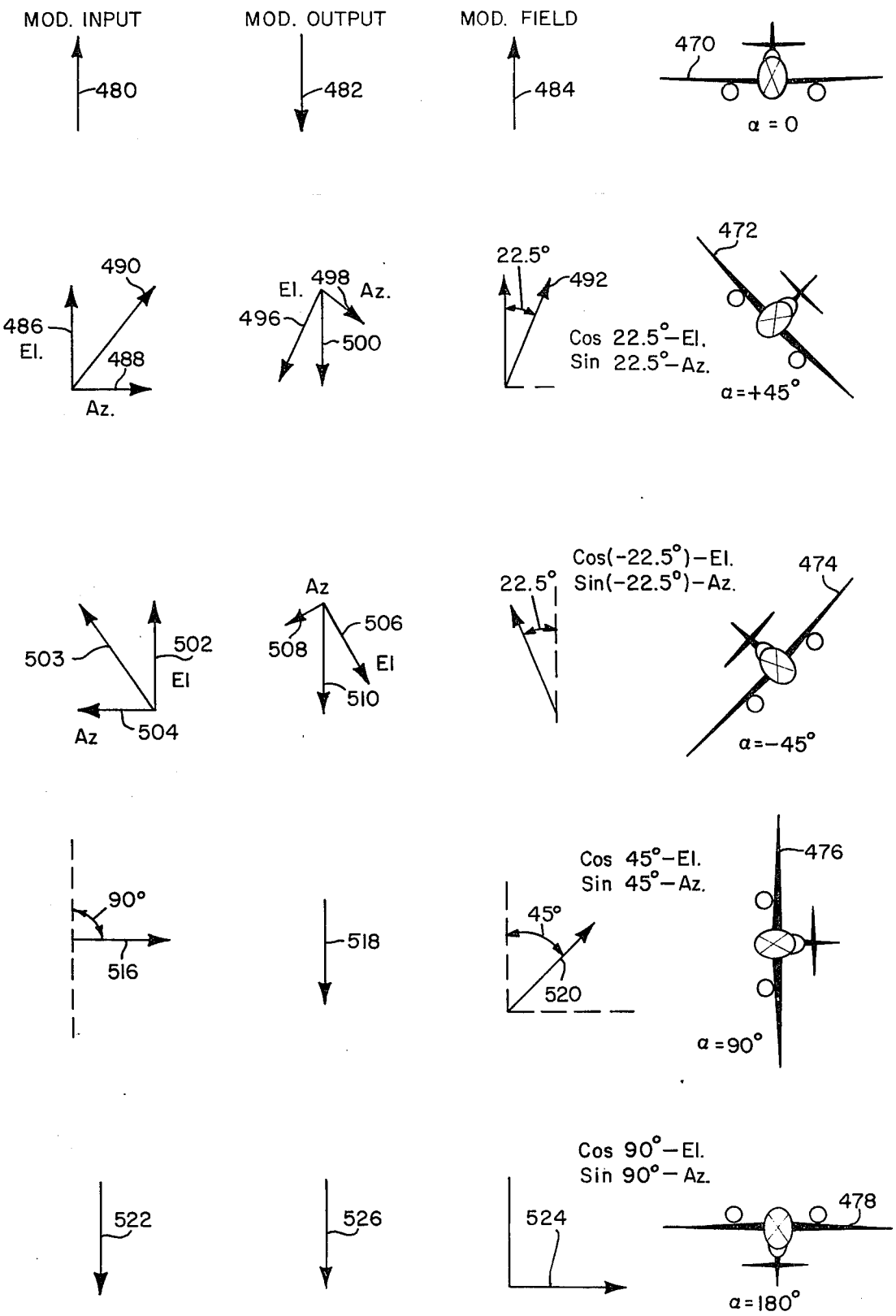
FIG. 12 is a schematic diagram of electrical vectors and magnetic field vectors for further explaining the operation of the system of FIGS. 1 and 2.

Referring now to FIG. 12 as well as to FIGS. 1 and 2 the operation of the system in accordance with this invention for correcting a roll angle $\alpha$ will be further described. The system of the invention operates automatically in response to any roll angle from 0° to 180°, as indicated by aircraft 470, 472, 474, 476 and 478 respectively at $\alpha$ angular positions 0°, +45°, −45°, +90° and +180°. For the $\alpha$ equals 0° or no roll condition, the modulator input as indicated by a vector 480 is inverted in the ferrite modulator 56 and passed to the output waveguide 100 as a vector 482 for one pulse repetition frequency interval. For this condition, the sin $\alpha/2$ and cos $\alpha/2$ values are respectively zero and one (FIG. 4) so only the elevation field is switched to the position shown by the vector 484 or to the opposite position in an alternate lobe. It is to be noted that in FIG. 12 for convenience of illustration the field vector and the modulator output vector are only shown for one selected lobing or pulse repetition interval which is repetitive every second interval, and it is to be understood that during alternate PRF intervals the modulating field is inverted and the output vectors are changed accordingly. For a roll angle of $\alpha = +45°$ as shown by the aircraft 472, the elevation and azimuth vectors 486 and 488 of the rotated input vector 490, are applied to the input of the modulator 56 and the modulating field has an angle of a vector 492 provided by cos 22.5° signal applied to the selected elevation winding and a sin 22.5° signal applied to the selected azimuth winding. As a result, elevation and azimuth vectors 496 and 498 are developed in the modulator 56 rotated 22.5° and the resultant vector 500 is passed through the coupler 60 to the waveguide 100, which vector has an amplitude equal to the resultant vector 490, and in the system of the invention is treated as if it were the elevation vector. For a roll angle $\alpha$ of −45° as shown by the aircraft 474 the elevation and azimuth vectors 502 and 504 of the vector 503 applied to the input of the modulator 56 responds to the field of the vector 512 rotated in response to cos (−22.5)° and sin (−22.5)° respectively applied to the selected elevation azimuth pole pairs. The respective elevation and azimuth vectors 506 and 508 provide a vector 510 which is passed through the coupler 60 to the output waveguide 100. Although the output vector is inverted for the negative roll condition, the system operates properly because this condition corresponds to the polarity of the next PRF interval. For the $\alpha = 90°$ roll condition of aircraft 476, the modulator input is shown by a vector 516 entirely in the azimuth plane and in response to the cos 45° signal for the elevation and a sin 45° signal for the azimuth which are applied to selected poles, a field of a vector 520 is rotated 45°. As a result, the modulator output passes through the coupler 60 as shown by vector 518 substantially equal in amplitude to the input vector 516. For the aircraft 478 roll condition of $\alpha$ equals 180° the modulator input of a vector 522 responds to the field vector 524 resulting from an elevation and azimuth current of cos 90° and sin 90°. Because the field vector 524 does not effect the elevation vector 522 the vector passed through the coupler 60 is shown by the vector 526. Thus the system of FIGS. 1 and 2 operates continuously regardless of the roll angle from 0° to 360° to alternately apply sine signals to the azimuth pole and a cosine signal to elevation pole during each lobing interval with the azimuth and elevation pole pairs being switched during each lobing interval. It is to be noted that the system of the invention is applicable to collections of poles as indicated by additional poles 261, 263, 265 and 267 of FIG. 4. by properly varying the current source and the switch 68 and is not limited to a four pole ferrite modulator. The system of the invention, regardless of roll angle, provides maximum and constant amplitude signals at the output of the coupler which is then utilized for providing an accurate and reliable range determination on boresight.

Thus there has been described an improved system operable with a lobing type modulator for accurately determining the range on the boresight of an antenna regardless of the roll angle of the craft. This system automatically switches between a first elevation and azimuth pole pair and a second elevation and azimuth pole pair during alternate lobing intervals and during each interval applies the proper field positioning current to each pole. The sine of one-half the roll angle is applied to the azimuth poles, and the cosine of one-half the roll angle is applied to the elevation poles. The principles in the invention are equally applicable to collection of poles such as for example an eight pole modulator. The system provides accurate and reliable roll compensation with a minimum of weight and without the requirement of additional roll gimbal and drive systems.

What is claimed is:

1. A roll angle correction system for a radar system operating at a pulse repetition frequency and having a modulator with a rotating field for space rotating received elevation and azimuth difference signals, said modulator having azimuth and elevation poles to form a first group of azimuth and elevation poles and a second group of azimuth and elevation poles comprising a source of roll angle signals having amplitudes representative of a roll angle correction, computer means responsive to said source of roll angle signals for developing first and second roll correction signals, and switching means coupled between said computer means and said first and second groups of azimuth and elevation poles and responsive to said pulse repetition frequency for applying said first and second roll correction signals alternately to said first and second groups for rotating the elevation and azimuth difference signals to correct for the roll angle.

2. A roll angle compensation system for a radar system having a rotatable ferrite modulator responsive to difference signals from an antenna and including a first azimuth and elevation pole pair and a second azimuth and elevation pole pair, said modulator having a polarized output, said radar system having a source of timing pulses and a source of roll angle signals comprising computer means responsive to said source of roll angle signals for providing cosine signals and sine signals as a function of said roll angle, and switching means responsive to said timing signals and coupled between said computer means and said pole pairs for alternately applying both said cosine and sine signals to said first pole pair and to said second pole pair.

3. The combination of claim 2 in which said switching means is coupled so that during the alternate switching to said pole pairs, said cosine signals are applied to the corresponding elevation pole and said sine signals are applied to the corresponding azimuth poles.

4. The combination of claim 3 in which said timing signals are pulse repetition frequency signals and said cosine and sine signals applied to said pole pairs are direct current signals.

5. The combination of claim 4 in which said roll angle represents the angle of roll of the antenna and the cosine and sine signals are respectively a function of the cosine of half of the roll angle and the sine of half of the roll angle.

6. In a radar system operating at a pulse repetition frequency having a sum and difference network with outputs providing first and second difference signals and a sum signal, modulating means coupled to said first and second difference outputs for rotating the first and second difference signals in space quadrature and for coupling the rotated signals to an output terminal with a selected polarization, said modulation means having first and second elevation pole means and first and second azimuth pole means for respectively controlling the elevation and azimuth vectors of the rotating field, coupler means coupled to the output terminal of said modulator and coupled to the sum output of said sum and difference network for receiving said sum signal and processing means coupled to coupler means for alternately switching between pulse repetition frequency intervals to an upper and lower storage element the signal provided by said coupler means and comparing said storage elements to provide a signal representative of the time of occurrence of the elevation boresight and determining range at said elevation boresight, said system having a source of aircraft roll signals $\alpha$, a roll compensation system comprising cosine-sine computer means responsive to the angle $\alpha$ signal to provide $\cos \alpha/2$ and $\sin \alpha/2$ signals, switching means coupled between said cosinesine computer means and the pole means of said modulator and responsive to pulse repetition frequency signals to alternately switch between a first pair of the first elevation and the first azimuth pole means and a second pair of the second elevation and the second azimuth pole means, and to apply said $\sin \alpha/2$ signal to the corresponding azimuth pole means and said $\cos \alpha/2$ signal to the corresponding elevation pole means.

7. The combination of claim 6 in which the $\cos \alpha/2$ and the $\sin \alpha/2$ signals provided by said cosinesine computer means are alternating current signals and rectifier means is coupled between said cosine-sine computer means and said switching means to provide direct current signals $\cos \alpha/2$ and $\sin \alpha/2$ to said pole means.

8. The combination of claim 7 in which said switching means includes bistable means responsive to said pulse repetition frequency signals and gating means coupled between said pole means and said rectifier means and responsive to said bistable means for alternately applying the rectified $\sin \alpha/2$ and $\cos \alpha/2$ signals to the respective azimuth and elevation pole means of said first and second pairs.

9. An antenna roll compensation system in a radar system having a rotatable modulator for rotating elevation and azimuth difference signals in response to first and second groups of windings and having a source of roll angle signals and pulse repetition frequency signals comprising computing means responsive to said roll angle signals for developing cosine of half the roll angle and sine of one-half the roll angle signals, and switching means responsive to said pulse repetition frequency signals and coupled to said computing means for applying both said cosine and sine signals to alternate ones of said first and second groups of windings of said modulator.

10. The combination of claim 9 in which said first and second groups of windings each includes a first and a second winding each representative of an orthogonal space dimension and in which said switching means includes means to apply said cosine signals to said first windings and said sine signal to said second windings in both said first and second group of windings.

* * * * *